United States Patent Office 2,785,141
Patented Mar. 12, 1957

2,785,141

VANADIUM HYDROCARBON CONVERSION CATALYSTS

Raymond N. Fleck, Long Beach, Calif., assignor to Union Oil Company of California, Los Angeles, Calif., a corporation of California No Drawing. Application January 2, 1953,
Serial No. 329,435

6 Claims. (Cl. 252—464)

This invention relates to certain novel carrier-supported vanadium catalysts and to the utilization thereof for promoting various hydrocarbon conversion reactions such as desulfurization, denitrogenation, hydrogenation, dehydrogenation, reforming, hydroforming, hydrocracking, etc. A particularly important aspect of the invention relates to certain novel procedures for preparing such catalysts, involving the use of ammonium sulfide as a fluxing agent to distribute the desired proportion of vanadium uniformly on the carrier.

An object of the invention is to provide methods whereby relatively large proportions, e. g. from 7% to 20% of vanadium pentoxide may be incorporated into a carrier by a single impregnation step.

Still another object is to provide coprecipitation methods for simultaneously precipitating from solution a carrier and a vanadium compound, which method avoids the use of large volumes of solution.

Another object is to provide methods for uniformly redistributing vanadium compounds in a heterogeneous conglomerate of a carrier and a vanadium compound.

A broader object is to provide highly active catalysts containing large proportions of vanadium oxide uniformly distributed over or in a carrier, and containing at most a small residual sulfur content in non-deleterious form.

Other objects will be apparent from the description which follows.

Vanadium oxide catalysts supported on various carriers such as alumina, silica, activated clays, etc. are known to be active in promoting the above types of hydrocarbon conversions. They are particularly valuable because of their resistance to sulfur-poisoning which normally occurs when other conversion catalysts are employed for treating hydrocarbon stocks which contain sulfur compounds. Molybdenum oxide, cobalt oxide, and nickel oxide for example normally suffer considerable loss in activity after a given on-stream period, and must then be regenerated as by heating with air at e. g. 900–1500° F. to remove contaminating sulfur and carbon. After repeated regenerations, such catalysts may not be restored to their original activity, and hence must eventually be discarded. Vanadium catalysts on the other hand retain their activity for a longer on-stream period, and being more heat stable, may be regenerated to correspondingly higher levels of activity.

It has been found that the physical state of the vanadium or vanadium oxide in the catalyst is a highly important factor. Those catalysts wherein the vanadium is non-homogeneously distributed, as for example in the form of relatively large particles, are less active than those wherein the same amount of vanadium is evenly distributed. For example, a catalyst prepared by copilling powdered vanadium oxide, $V_2O_5$ with powdered alumina is considerably less active than a corresponding catalyst prepared by impregnating pre-formed alumina pellets with an aqueous solution of a vanadium compound, and subsequently drying the catalyst and thermally decomposing the vanadium compound to $V_2O_5$. In the latter case the $V_2O_5$ is more evenly distributed and presents a much larger active surface area. Coprecipitation of alumina and vanadium from an aqueous solution also results in a highly active catalyst.

In the past however, it has been extremely difficult to prepare satisfactory co-precipitated or impregnated vanadium catalysts owing mainly to the fact that very few vanadium salts exist which are sufficiently soluble in water or other common solvents to give a satisfactory proportion of vanadium deposited on the carrier from a single impregnation, and at the same time are free of deleterious ions such as sodium, chloride, etc. In the coprecipitation method, large volumes of solutions and reagents need to be handled and filtered, thus increasing the cost of the catalyst. In impregnation, one may resort to multiple impregnations, but here again handling costs increase, and such multiple impregnations generally result in a catalyst of inferior physical strength and sometimes of inferior activity.

Some of the salts which have been employed in the past for impregnation include vanadyl sulphate $VOSO_4$, ammonium metavanadate $NH_4VO_3$, sodium metavanadate $NaVO_3$, and some of the oxyhalides. Vanadyl sulfate and sodium metavanadate, as well as some of the halides, are all very soluble in water, but are not satisfactory because they introduce a contaminating ion into the catalyst which is not easily removed by either washing or combustion. Thus, sodium is extremely difficult to remove even with repeated acid washing, and this ion is very deleterious to the activity and the thermal stability of the catalyst. Halogen and sulfate ions tend to combine with components of most carriers and are therefore difficult to remove completely, even by calcining at high temperatures. Ordinarily the nitrate is a very suitable salt for impregnation procedures, but vanadium is not known to form any stable nitrates, and nitric acid solutions are unsuitable because they tend to dissolve the carrier. The same is true of other highly acidic solutions.

Ammonium metavanadate is a suitable source of vanadium from all standpoints except solubility. In water, this salt is soluble only to the extent of about 7% at 100° C., with decomposition. The use of excess ammonium hydroxide does not appreciably increase the solubility of the metavanadate, and may in some cases decrease its solubility. By a single impregnation with a 7% solution of ammonium metavanadate it is possible to retain on the carrier a maximum equivalent of about 3–4% of $V_2O_5$. By drying and re-impregnating, an additional 2% may be deposited; the third impregnation will deposit only about 1.7%. It will be seen therefore that at least about four impregnations would be required in order to obtain a catalyst containing for example 10% $V_2O_5$. The catalyst should contain from about 7% to 30% $V_2O_5$ by weight for optimum results in hydrocarbon conversion processes.

It has now been found that suitable vanadium salts and oxides may be dissolved in aqueous ammonium sulfide to furnish concentrated solutions which may be utilized for impregnating, coprecipitating or otherwise homogeneously distributing vanadium on or in suitable carriers. Catalysts prepared by the use of such solutions may initially contain vanadium in the form of a sulfide, or a thiovanadate, but in any case most or all the combined sulfur is readily removed by heating to e. g. 600–1500° F. for 15 minutes to 6 hours, preferably in the presence of an oxygen-containing gas which accelerates the removal by forming oxides of sulfur. After such a calcining treatment the finished catalyst contains at most a residual trace of sulfur, less than about 2%, which does not deleteriously affect its activity as determined by comparison with analogous catalysts prepared by repeated impregnations with aqueous ammonium metavanadate, or other vanadium salts. At least three general methods may be employed for preparing the herein described catalysts, and each of these methods will now be described in more detail.

I. IMPREGNATION

The term "impregnation" is now well understood in the art as designating those methods wherein a suitable carrier is immersed in the impregnation solution for a short period of time, then drained, dried at for example between 180° F. and 230° F., and finally activated by heating to a temperature between about 800° F. and 1500° F. for 2 to 6 hours. Prior to the impregnation step, the carrier is normally shaped into the physical form desired for the catalyst. For this purpose the dried carrier is usually ground, mixed with a lubricant such as graphite or hydrogenated vegetable oil and pilled. In the activation of the carrier the lubricant is removed by combustion. Alternatively the carrier may be used in granular form; or it may be ground into powder, made into a paste and extruded. Where the catalyst is to be employed in a fluidized process, such as in fluidized desulfurization, denitrogenation, and the like, the carrier is formed into a finely divided state as in microbead form, or it is ground into a fine state and is thereafter impregnated. In the case of fluidized processes the carrier can be impregnated in larger form, e. g. granules, pills, etc., and thereafter ground to the desired powder size for the processing.

The impregnation solution consists preferably of an aqueous ammonium sulfide solution containing dissolved therein a suitable proportion of a vanadium compound, for example ammonium metavanadate or vanadic oxide. In order to prepare a catalyst containing between about 7% and 20% by weight of $V_2O_5$ it is ordinarily necessary to employ an impregnation solution containing the equivalent of about 14 to 40 grams of $V_2O_5$ per 100 ml. of solution. Solutions of this concentration may be readily prepared at room temperature or slightly above by merely stirring the desired amount of vanadium compound into the ammonium sulfide solution. The finished catalyst, on a dry basis, should contain between about 5% and 30% by weight, and preferably between about 7% and 20% of $V_2O_5$.

The following examples illustrate specific impregnation procedures.

Example I

An activated bauxite (commercially available under the trade name of "Porocel") after a preliminary drying, and grinding to 8 to 20 mesh was activated by heating for 2 hours at 1100° F. An impregnation solution was prepared by dissolving 240 grams of ammonium metavanadate in sufficient aqueous ammonium sulfide (20% minimum assay) to form 1 liter of solution. One liter of the activated bauxite carrier was immersed in the impregnation solution for 55 minutes, drained, dried at about 200–220° F. and then heated for 2 hours at 1100° F. The once-impregnated material was estimated to contain about 10% by weight of $V_2O_5$.

About 800 ml. of the once impregnated material was re-impregnated with 180 grams of ammonium metavanadate dissolved in sufficient ammonium sulfide to form 840 ml. of solution with a 40 minute impregnation time. After draining, drying and calcining at 1100° F. the material was found to contain 18.5% by weight of $V_2O_5$. The sulfur content was estimated to be about 0.1–0.4% by weight.

Example II

An alumina-silica gel containing an estimated 95% $Al_2O_3$ and 5% $SiO_2$ is prepared by the coprecipitation of an aqueous mixture of sodium aluminate and sodium silicate with carbon dioxide. The precipitate is washed until substantially free of sodium ions, dried at 200–220° F., pelleted into 3/16" pills and then activated by heating for two hours at about 1100° F. A solution of ammonium metavanadate is prepared by stirring at room temperature about 160 grams of powdered ammonium metavanadate in a sufficient volume of aqueous ammonium sulfide solution (20% minimum assay) to form 840 ml. of solution. About 800 parts by weight of the activated gel is immersed in the impregnation solution, soaked for one-half hour, drained, dried and heated at 1050–1150° F. for about two hours in a stream of air. The final catalyst has the following approximate composition:

| | Percent |
|---|---|
| $Al_2O_3$ | 90.0 |
| $SiO_2$ | 4.6 |
| $V_2O_5$ | 6.2 |
| S | 0.2 |

Obviously the above procedures may be varied considerably in details and materials. Any suitable carrier may be substituted for those illustrated. Suitable carriers include for instance alumina, silica, zirconia, thoria, magnesia, titania or any combination of these materials. Other activated clays may be employed, such as for example an acid washed bentonite clay. Suitable bentonite clays include for example that known in the trade as Filtrol. The preferred carrier is activated, gel-type alumina. Alumina gels containing between about 1% and 15% and preferably between about 3% and 8% of coprecipitated silica are especially suitable carriers. The presence of the small amount of silica in the alumina serves to stabilize the resulting catalyst and prolongs the catalyst life as is described in U. S. Patent No. 2,437,532.

II. COPRECIPITATION

The term "coprecipitation," as employed herein, means broadly precipitating from one or more aqueous solutions an intimately admixed precipitate containing both the carrier and the vanadium compound. In one method of coprecipitation for example, excess ammonia may first be added to an ammonium sulfide solution of ammonium metavanadate. A second solution is then prepared containing a soluble salt of the desired carrier, for example aluminum nitrate. The two solutions are then mixed with stirring whereupon a precipitate of aluminum hydroxide forms which carries with it all or a major proportion of the vanadium. The mechanism by which the vanadium is precipitated is not clearly understood, but may involve the formation of such compounds as aluminum metavanadate, aluminum metathiovanadate, vanadium pentoxide, vanadium sulfides, or vanadium oxysulfides. A colloidal coprecipitation without true chemical combination may also be involved, inasmuch as the vanadium sulfides in ammonium sulfide appear to be more in the form of a colloidal sol than a true solution. In any event the precipitate is filtered, washed, dried as described above, and activated by heating from 800° F. to 1500° F. for 2 to 6 hours. The following example may serve to illustrate further this general procedure but should not be construed as limiting.

Example III

A solution of aluminum nitrate was prepared by dissolving about 6,560 grams of aluminum nitrate nonahydrate $Al(NO_3)_3.9H_2O$ in 15 liters of water and 1 liter of 28% ammonium hydroxide was added thereto. About 170 grams of ammonium metavanadate was then stirred into 900 ml. of 20% aqueous ammonium sulfide solution. The vanadium solution was poured into the rapidly stirred aluminum nitrate solution and 2330 ml. of 25% aqueous ammonia was added. The total ammonia is the theoretical amount required to precipitate all the aluminum nitrate. A voluminous dark colored precipitate formed which was filtered off and washed three times by resuspension in distilled water and filtration. The washed precipitate was dried at 200° F. for four hours. The dried material was then ground to under 45 mesh and compressed into 1/8" pellets using graphite as a lubricant. The pellets were then activated by calcining at 1050–1150° F. in a stream of nitrogen for 6 hours. The finished catalyst had the following approximate water-free composition.

|  | Percent |
|---|---|
| $Al_2O_3$ | 85.5 |
| $V_2O_5$ | 11.0 |
| S | 1.3 |
| C | 2.2 |

If desired the dried precipitate may first be calcined in air in order to remove the sulfur. During usage of the catalyst the sulfur is normally removed during regeneration with air however. The procedure described in this example may likewise be applied to other soluble salts of aluminum or other metals, depending on the type of carrier desired.

III. CO-PELLETING

The term "co-pelleting" as described herein means the formation first of a conglomerate comprising a carrier and a vanadium compound as for example by grinding those materials together in a solid state, and then the forming of the conglomerate into shaped pellets, pills or granules. Catalysts prepared in this manner are characterized by the presence of discrete particles of vanadium compound, and thus are at least microscopically nonhomogeneous.

In the past such co-pelleted catalysts containing active metals other than vanadium have been treated by various procedures to effect a more even redistribution of the active metal in the carrier. One such method involves heating the catalyst in a closed container at 1000–1500° F. for several hours to cause the active metal or metal oxide to be sublimed, and thereby adsorbed into the pores of the carrier. Another method involves wetting the catalyst with a selective solvent to partially dissolve and redistribute the active metal. However, the subliming procedure is ineffective in the case of vanadium pentoxide owing to its highly involatile nature at temperatures below the inactivation temperature of the carrier, e. g. below 2000° F. The selective solvent redistribution method is difficult because large volumes of the conventional vanadium solvents must be used resulting in considerable leaching out of vanadium. The solvent employed in this latter method should have a high solvent power for the vanadium compound and substantially no solvent action on the carrier. Ammonium sulfide solutions containing between about 10% and 30% $(NH_4)_2S$ are found to satisfy these requirements, so that substantially no excess solvent, other than the amount which the dry catalyst will absorb by capillarity and/or adsorption is necessary in order to achieve effective redistribution of the vanadium. Preferably about 0.05 to 3 ml. of 20% ammonium sulfide are employed per gram of dry catalyst, although other proportions may be employed.

In the preferred solvent redistribution method, the pelleted, dried and activated catalyst is first saturated with the ammonium sulfide solution, and any excess solvent drained therefrom before appreciable leaching takes place. The drained, wet catalyst is then maintained in a closed container for any desired length of time, e. g. from 0.5 to 6 hours and is then dried and calcined in air to remove sulfur and reactivate the catalyst.

Alternatively, the powdered conglomerate may be wetted with the solvent, then dried, pelleted and calcined. It is ordinarily desirable to avoid leaching the catalyst with excess solvent. In some cases however, it may be feasible to provide more than the desired final concentration of vanadium in the conglomerate, and then leach out a part thereof and employ the extract for impregnation or other purposes.

An alumina-silica gel containing an estimated 95% $Al_2O_3$ and 5% silica is prepared by the coprecipitation of an aqueous mixture of sodium aluminate and sodium silicate with carbon dioxide. The precipitate after washing to remove sodium ions was dried at 200° F.

About 2000 g. of the alumina-silica (containing about 35% $H_2O$), 230 g. of ammonium metavanadate and 89 g. of graphite were mixed and pelleted into 3/8" pills. A portion of the pills are calcined in nitrogen to avoid combustion of the graphite. A second portion of the pills is uniformly wetted with 0.2 ml. of 20% aqueous ammonium sulfide per gram of pills and then calcined in nitrogen.

The finished catalysts contain about 10% by weight of evenly distributed $V_2O_5$.

The procedure of this example may be employed without substantial modification for copelleting other carriers, e. g. alumina, or activated clays and other vanadium compounds, e. g. vanadium oxides, vanadium sulfides.

IV. USE OF CATALYSTS

Catalysts prepared by any of the above methods, at a given $V_2O_5$ level, are substantially equivalent in their activity for promoting hydrocarbon conversions, and in resistance to sulfur poisoning.

The finished catalysts are useful for effecting various hydrocarbon conversion reactions such as isomerization, desulfurization, denitrogenation, hydrogenation, hydroforming, reforming, hydrocracking, destructive hydrogenation and the like. Such reactions may be carried out in the presence of hydrogen at temperatures between about 500° F. and 1500° F. and especially at temperatures between about 600° F. and 1200° F.

During usage varying amounts of deposits comprising mostly carbon, nitrogen and sulfur compounds accumulate on the catalyst and are periodically removed by regeneration. Regeneration is effected by passing air diluted with flue gas, steam, nitrogen or other inert gas over the catalyst to combust the deposits while maintaining the temperature of the catalyst between 800° F. and 1200° F. The combustion is completed in the presence of undiluted air while maintaining the temperature of the catalyst between 800° F. and 1200° F. The regenerated catalyst after reduction with hydrogen may be employed for hydrocarbon conversion catalysis.

For the purpose of desulfurizing petroleum stocks, shale distillates and the like, the catalysts of this invention are preferably employed under the following conditions: reaction temperatures between about 600° F. to 1000° F., pressures between about atmospheric and 5000 lbs. per square inch or more and at liquid hourly space velocities between about 0.2 and 50.0 volumes of liquid feed stock per volume of catalyst per hour, and 50 to 10,000 cubic feet of added hydrogen per barrel of feed. The particular set of conditions within these ranges is determined by the stock to be desulfurized and by the nature of the product desired.

The catalysts of this invention can also be employed for denitrogenation of such stocks as coal tar distillates, shale oils and heavy petroleum distillates whereby up to 99% of the nitrogen and substantially 100% of the sulfur can be removed simultaneously. For denitrogenation of such stocks the following conditions are preferably employed: reaction temperatures between about 700° F. and 1000° F., pressures between about 50 and 10,000 lbs. per square inch, feed rates between about 0.2 and 10.0 volumes of liquid feed stock per volume of catalyst per hour, and about 500 to 10,000 cubic feet of added hydrogen per barrel of feed. For the removal of nitrogen it is often desirable to employ a two-stage denitrogenation process wherein the ammonia synthesized in the first stage is removed from the first stage product prior to its entry into the second stage denitrogenation and wherein the ammonia and hydrogen sulfide are removed from the recycle hydrogen gas streams in each stage. Under these conditions the maximum efficiency for removing nitrogen from the stocks is obtained.

The catalysts described herein may also be employed for reforming such as for the particular reforming process which is generally termed "hydroforming." This process serves to reform a gasoline range hydrocarbon stock to increase its aromatic content and improve its octane rating. For processing stocks for the purpose of reforming and increasing their aromaticity, the following conditions are preferably employed: reaction temperatures between about 700° F. and 1200° F., pressures between about 50 to 1000 lbs. per square inch, liquid hourly space velocities between about 0.2 and 4.0 volumes of liquid feed stock per volume of catalyst per hour, and about 1,000 to 10,000 cubic feet of added hydrogen per barrel of feed. The specific conditions within these are determined by the nature of the specific feed stock employed and the quality of the product desired.

The following examples will serve to illustrate specific utility of the catalysts:

*Example V*

A thermally cracked petroleum fraction boiling between about 200° F. and 400° F., from a California crude was selected for a hydroforming run. The feed stock had a gravity of 52.7° A. P. I., contained 1.3% sulfur, 12.7 volume percent aromatics, 18.4 volume percent olefins and had an octane rating of about 57 as measured by the research method. The catalyst of Example I was employed in the form of 8 to 20 mesh granules.

At the beginning of the run the catalyst was first reduced at atmospheric pressure with hydrogen while controlling the rate to maintain the temperature below 1050° F. after which the reduction was finally completed under the reaction pressure to be employed. While continuing the hydrogen flow through the catalyst, the preheated feed stock was started through the catalyst bed and continued at the desired feed rate measured in terms of volumes of liquid feed stock per volume of catalyst per hour and for the desired number of hours, after which time the hydrogen addition was continued for a short while in order to purge the catalyst of products.

The test conditions were as follows:

| | |
|---|---|
| Temperature, ° F. | 950 |
| Pressure, p. s. i. g. | 100 |
| Liquid hourly space velocity | 1.0 |
| Hydrogen, cu. ft./bbl. feed | 3000 |
| Run length, hours | 4 |

The liquid product was cooled under pressure, withdrawn and washed with both caustic and water. Product examination showed the following results:

| | |
|---|---|
| Yield, vol. percent of feed | 85.2 |
| Sulfur content, wt. percent | 0.037 |
| Vol. percent aromatics | 29.4 |
| Vol. percent olefins | 12.6 |
| Synthetic aromatic yield, vol. percent of feed | 12.4 |

This example shows a highly active catalyst which is substantially equal in activity to a similar vanadium catalyst containing no sulfur and prepared by repeated impregnation of the carrier with 5% aqueous ammonium metavanadate.

*Example VI*

The catalyst of Example I is employed for desulfurizing a Santa Maria valley pressure distillate boiling in the 400–650° F. range and having the following characteristics:

| | |
|---|---|
| Gravity, ° A. P. I. at 60° F. | 33 |
| Sulfur, weight percent | 2.3 |

The catalyst is pretreated as described in Example IV and the feed stock treated under the following conditions:

| | |
|---|---|
| Temperature, ° F. | 750 |
| Pressure, p. s. i. g. | 150 |
| Liquid hourly space velocity | 2.0 |
| Hydrogen, cu. ft./bbl. feed | 3000 |
| Run length, hours | 6 |

The liquid product obtained shows a sulfur content of 0.4% by weight. The catalyst retains its activity for a long onstream period and may be regenerated to substantially its original activity.

*Example VII*

The coprecipitated catalyst of Example III is particularly well suited for high temperature reforming such as in the 1000° F. to 1050° F. range and above. The catalyst is tested under the following conditions:

| | |
|---|---|
| Temperature, ° F. | 1050 |
| Pressure, p. s. i. g. | 100 |
| Liquid hourly space velocity | 1.5 |
| Hydrogen, cu. ft./bbl. feed | 3000 |
| Run length, hours | 4 |

The following results are obtained:

| Catalyst | 11% $V_2O_5$ Catalyst of Example III | 11% $MoO_3$ Commercial Hydroforming Catalyst |
|---|---|---|
| Liquid Recovery, Vol. Percent | 64.2 | 66.2 |
| Synthetic Aromatics, Vol. Percent | 24.9 | 23.0 |
| Carbon Deposition on Catalyst, Wt. Percent | 9.2 | 14.0 |

The foregoing disclosure is not to be considered as limiting since many variations may be made by those skilled in the art without departing from the scope or spirit of the following claims.

I claim:

1. A method for preparing an impregnated carrier-supported vanadium catalyst which comprises preparing an impregnating solution by dissolving a vanadium compound selected from the class consisting of vanadium oxides, vanadium sulfides and ammonium metavanadate in a solvent which is essentially aqueous ammonium sulfide, said solvent containing a sufficient concentration of $(NH_4)_2S$ to dissolve said vanadium compound, impregnating a preformed, adsorbent oxide carrier with said impregnating solution, draining and drying the impregnated carrier, and calcining the dried carrier to convert impregnated vanadium compounds to vanadium oxide, and to reduce the sulfur content of said catalyst to below about 2% by weight.

2. A method as defined in claim 1 wherein said solvent contains between about 10% and 30% by weight of $(NH_4)_2S$.

3. A method according to claim 1 wherein said carrier is a coprecipitated alumina-silica gel containing between about 1% and 15% $SiO_2$.

4. A method according to claim 1 wherein said vanadium compound is ammonium metavanadate.

5. A method according to claim 1 wherein said impregnating solution contains dissolved therein the equivalent of between about 14 and 45 grams of $V_2O_5$ per 100 ml. of solution.

6. A method according to claim 1 wherein said impregnating solution is formed in situ concurrently with said impregnation by contacting aqueous ammonium sulfide with an intimate mixture of said preformed carrier and said vanadium compound.

References Cited in the file of this patent

UNITED STATES PATENTS

| | | |
|---|---|---|
| 1,932,174 | Gaus et al. | Oct. 24, 1933 |
| 2,279,199 | Huppke | Apr. 7, 1942 |
| 2,395,836 | Bates | Mar. 5, 1946 |
| 2,417,308 | Lee | Mar. 11, 1947 |
| 2,428,257 | Ahlberg et al. | Sept. 30, 1947 |
| 2,485,073 | Shiffler et al. | Oct. 18, 1949 |
| 2,486,361 | Nahin et al. | Oct. 25, 1949 |